United States Patent [19]

Klaila

[11] Patent Number: 4,778,970
[45] Date of Patent: Oct. 18, 1988

[54] VISCOSITY REDUCTION APPARATUS USING MICROWAVE ENERGY

[75] Inventor: William J. Klaila, Lafayette, La.

[73] Assignee: Electromagnetic Energy Corporation, Middleboro, Mass.

[21] Appl. No.: 144,707

[22] Filed: Jan. 14, 1988

Related U.S. Application Data

[63] Continuation of Ser. No. 770,748, Aug. 29, 1985, abandoned.

[51] Int. Cl.$^4$ ............................................. H05B 6/80
[52] U.S. Cl. ..................... 219/10.55 A; 219/10.55 D; 219/10.55 F; 34/1; 165/1
[58] Field of Search ................. 219/10.55 A, 10.55 F, 219/10.55 R, 10.55 D, 10.55 M; 34/1, 4; 43/112, 132.1, 124; 165/1; 241/1; 252/346; 166/60, 248

[56] References Cited

U.S. PATENT DOCUMENTS

| Re. 31,241 | 5/1983 | Klaila | 219/10.55 R X |
| 3,665,491 | 5/1972 | Cooper | 219/10.55 A |
| 4,004,122 | 1/1977 | Hallier | 219/10.55 F |
| 4,180,718 | 12/1979 | Hanson | 219/10.55 R X |
| 4,193,448 | 3/1980 | Jeambey | 219/10.55 A X |
| 4,256,944 | 3/1981 | Brandon | 219/10.55 A X |
| 4,332,091 | 6/1982 | Bensussan et al. | 219/10.55 A X |
| 4,370,534 | 1/1983 | Brandon | 219/10.55 A |
| 4,582,629 | 4/1986 | Wolf | 252/346 X |

Primary Examiner—Philip H. Leung
Attorney, Agent, or Firm—Herbert L. Bello

[57] ABSTRACT

A method and apparatus for reducing the viscosity of high viscosity material within a container. An electromagnetic enery source is mounted within a housing which is provided with a fixture that is configured to interconnect with the container of high viscosity material. A waveguide and a deflector are provided for directing the electromagnetic energy from the source to the container for heating the high viscosity material therein and reducing its viscosity.

12 Claims, 6 Drawing Sheets

VISCOSITY REDUCTION APPARATUS USING MICROWAVE ENERGY

This is a continuation of application Ser. No. 06/770,748, filed Aug. 29, 1985 now abandoned.

BACKGROUND OF THE INVENTION

1. Field of the Invention

The present invention is directed toward methods and apparatae for reducing viscosity of high viscosity materials.

2. Description of the Prior Art

U.S. Reissue Pat. No. 31,241 discloses a method and apparatus for controlling fluency of hydrocarbon fluids using electromagnetic energy. My copending application Ser. No. 602,399 describes an improvement of the method and apparatus for facilitating the removal of hydrocarbon fluids as well as a method and apparatus for recovering fractions from hydrocarbon fluids, insulating storage vessels, and cleaning storage vessels and pipelines. U.S. Pat. No. 4,208,562 discloses a method for the heating of materials within a cavity by use of electromagnetic energy.

In the past, chemicals have been employed to condition solids, resins, epoxies and other high viscosity materials which are used as protective coverings. Certain paints, vinyls, polyamides and urethane resins, epoxies, greases exhibit high viscosity which makes it difficult to remove them from containers. Also, high viscosity makes mixing and spraying very difficult, if not impossible. Generally, solvents are used for viscosity reduction in such cases. However, when solvent reduced materials are applied to the surface being covered, some of the solvent may be trapped below the skin of the faster drying outer surface. The difference in coefficients of expansion between the volatile solvents and the solids can cause cracking and checking of the protective surface and exposure of the unprotected undersurface to corrosion and early failure. Heretofore, various heating means, such as coils, steam rooms, hot boxes and the like, have been used with limited success in reducing the viscosity of contained high viscosity materials to attain the desired condition for pouring, mixing, pumping or spraying purposes. Often times, due to the difficulty in controlling the temperature of these heating processes, overheating and accompanying oxidation or loss of amines or other fractions may occur which cause deterioration.

SUMMARY OF THE INVENTION

An object of the present invention is to provide a method and apparatus for reducing the viscosity of high viscosity materials.

Another object of the present invention is to provide an apparatus which generates electromagnetic energy and is configured to interlock with a container of high viscosity material. The viscosity of the material is reduced by heating it with the electromagnetic energy. The apparatus includes a housing for a source of electromagnetic energy, the housing having an attached fixture which configured to interconnect with the container of high viscosity material. The electromagnetic energy source is coupled to a waveguide through which the electromagnetic energy is directed from the source to a deflector which deflects the electromagnetic energy into the material within the container. The electromagnetic energy heats the high viscosity material and reduces its viscosity.

A further object of the present invention is to provide a method for reducing the viscosity of a high viscosity material in a container. The method includes the steps of attaching a source of electromagnetic energy to a container of high viscosity material, generating electromagnetic energy, directing the generated electromagnetic energy toward the high viscosity material, and heating the high viscosity material with electromagnetic energy until its viscosity reaches a predetermined level.

Other objects of the present invention will in part be obvious and will in part appear hereinafter.

The invention accordingly comprises the apparatae, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
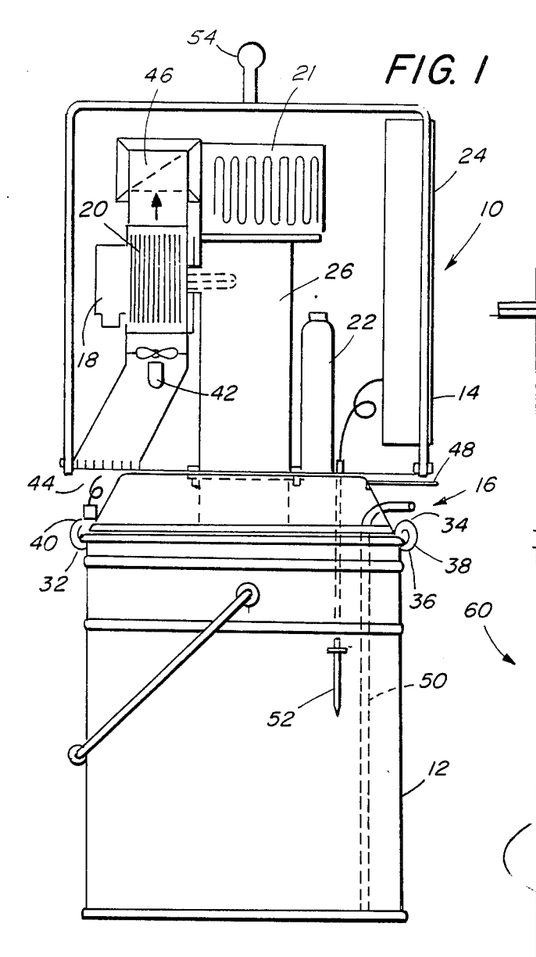
FIG. 1 is a side view of an apparatus made in accordance with the present invention for reducing the viscosity of a high viscosity material.
Figure 2:
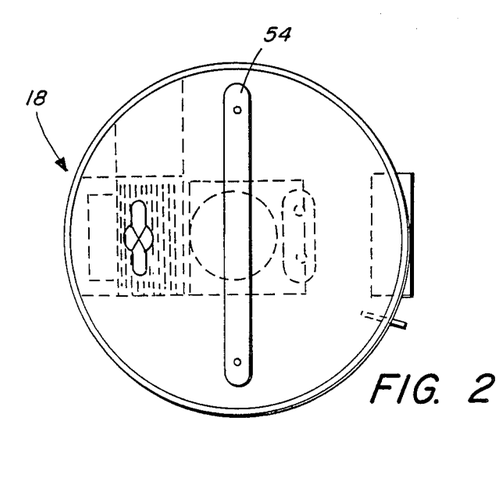
FIG. 2 is a top view of the apparatus of FIG. 1.

Referring now to the drawings, particularly FIG. 1, there is shown an apparatus 10 made in accordance with the present invention for reducing the viscosity of a high viscosity material in a container 12. Apparatus 10 includes an enclosure 14 which is provided with a fixture 16 that is configured to interlock with container 12. An electromagnetic energy source 18, which is mounted within enclosure 14, includes an electromagnetic energy generator 20 for example an oscillator, a high voltage/filament transformer 21, and a capacitor and rectifier unit 22. Operation of electromagnetic energy source 18 is controlled from a control panel 24 which is mounted to the enclosure 14. Electromagnetic energy generated by oscillator 20 is fed through a waveguide 26 which terminates in a gas tight radiotransparent antenna dome 28. A directional reflector 30 within antenna dome 28 redirects the microwave energy traveling in waveguide 26 into the material within container 12.

Fixture 16 includes a cover 32 having a beveled edge 34 at its lower end which is configured to mate with the top edge 36 of container 12. A locking clamp 38 is provided to hold cover 32 and container 12 in locking engagement. In operation, the beveled edge 34 is forced downwardly into intimate contact with the top rolled edge 36 of container 12 when the locking ring 38, for example a Marmon type clamp, is drawn together and secured. An interlock switch 40 is attached to cover 32 to provide an indication that the cover and container 12 are in locking engagement. If cover 32 and container 12 are not in proper mating engagement, interlock switch 40 remains open and source 18 can not be energized.

A fan 42 is provided for cooling source 18. In the illustrated embodiment, fresh air is drawn through a lower cooling vent 44 in enclosure 14 and is exhausted through an outlet vent 46 in the enclosure. A vent 48 is extended from the upper most internal area of cover 32 to allow for removal of excess vapors and pressure build-up due to thermal expansion of the material within container 12 when irradiated by the microwave energy. It is to be understood that a pressure relief valve (not shown) is used instead of vent 48. A suction tube 50 which extends through cover 32 and into container 12 is provided for removing the material within the container. After the material within container 12 has been exposed to the microwave energy, its viscosity is reduced to the point where it can be withdrawn by a suction pump attached to suction tube 50. A thermocouple 52 is placed within the high viscosity material in container 12 to monitor and control the temperature of the material. That is, thermocouple 52 senses the temperature of the material being irradiated within container 12 and generates temperature control signals to control panel 24. These control signals determine the ON and OFF time of electromagnetic energy source 18. A handle 54 is provided for lifting or carrying apparatus 10.

Figure 3:
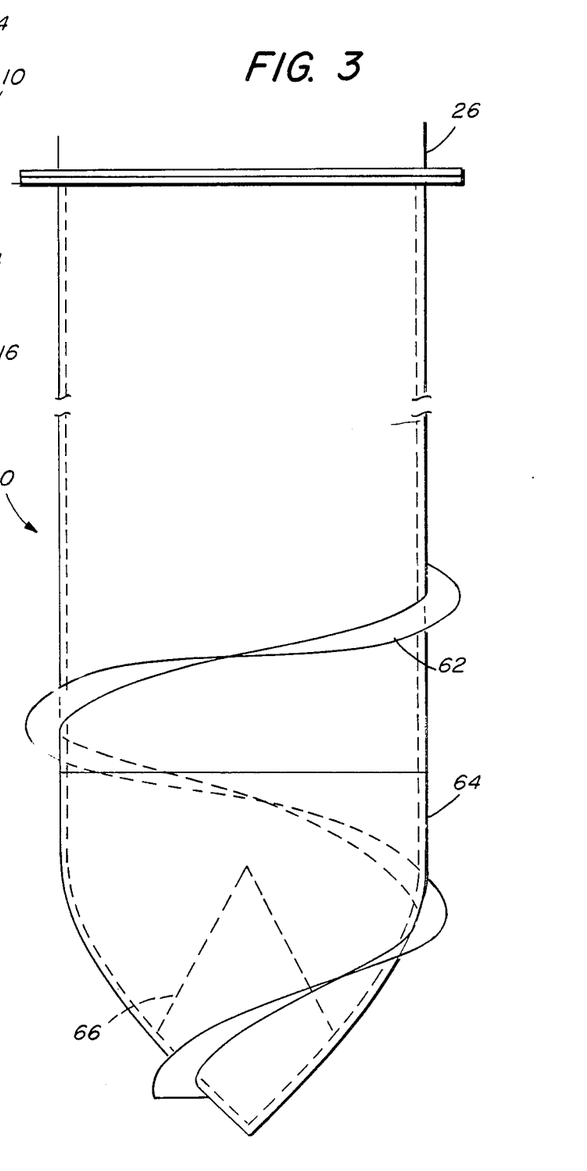
FIG. 3 is a side view of an alternative embodiment of the antenna waveguide of FIG. 1.

Referring now to FIG. 3, there is shown an alternative embodiment of antenna dome 28 in the form of an auger antenna 60 which is attached to waveguide 26. An auger blade 62 is wrapped around an antenna dome 64 to aid in immersion of waveguide 26 into the high viscosity material in container 12. A reflector 66 which redirects the waves traveling orthogonally down the waveguide 26 into the material within container 12. In operation of the FIG. 3 embodiment, apparatus 10 is positioned over the container and is screwed into the material by means of auger blades 62. The auger blades or vanes 62 may be constructed of ceramic, epoxy, fiberglass or the same material as antenna dome 64 where it is in contact therewith. In an alternate embodiment, auger vanes 62 are constructed of metal where it is in contact with the metal portion of waveguide 26.

Figure 4:
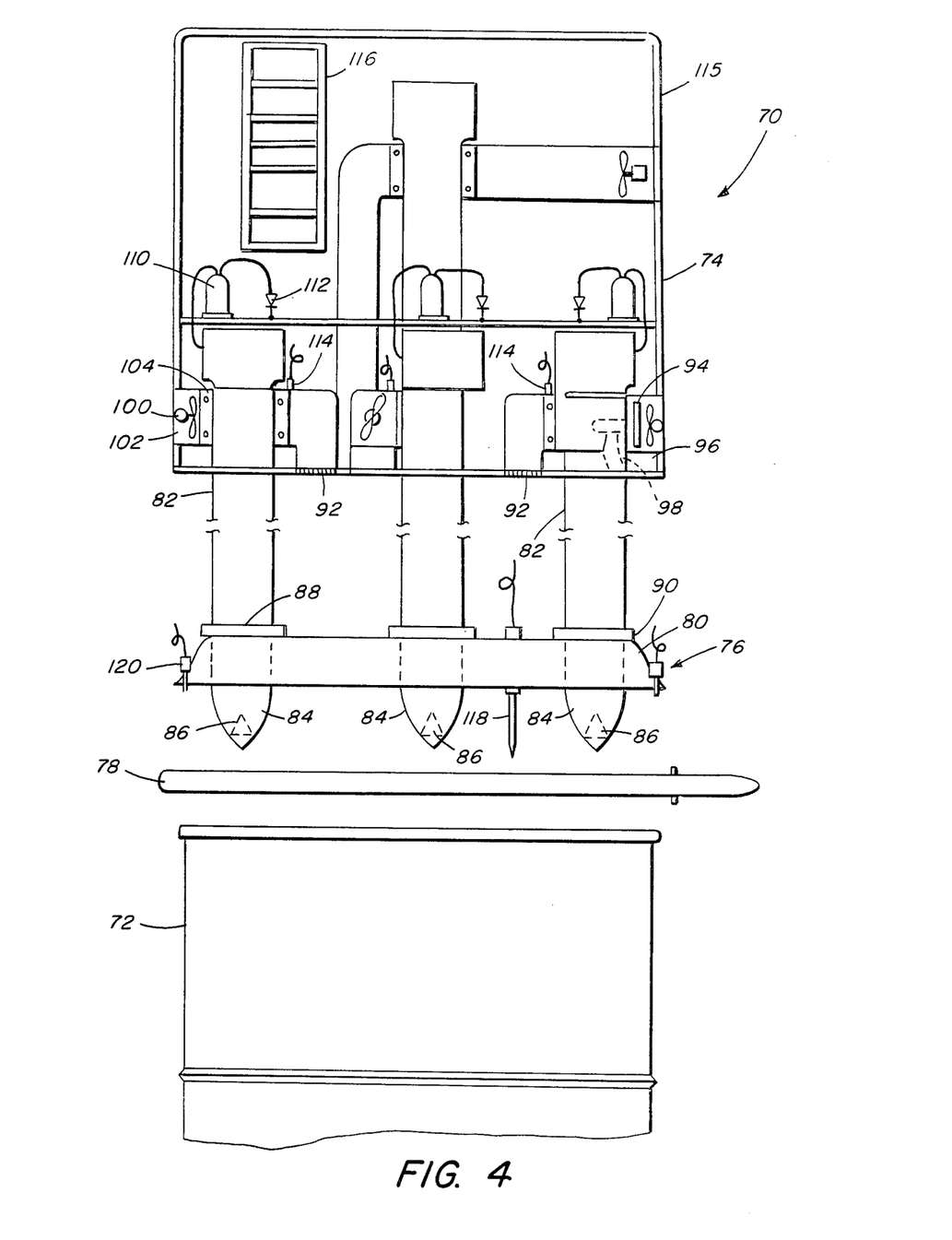
FIG. 4 is an alternate embodiment of the invention of FIG. 1.
Figure 5:
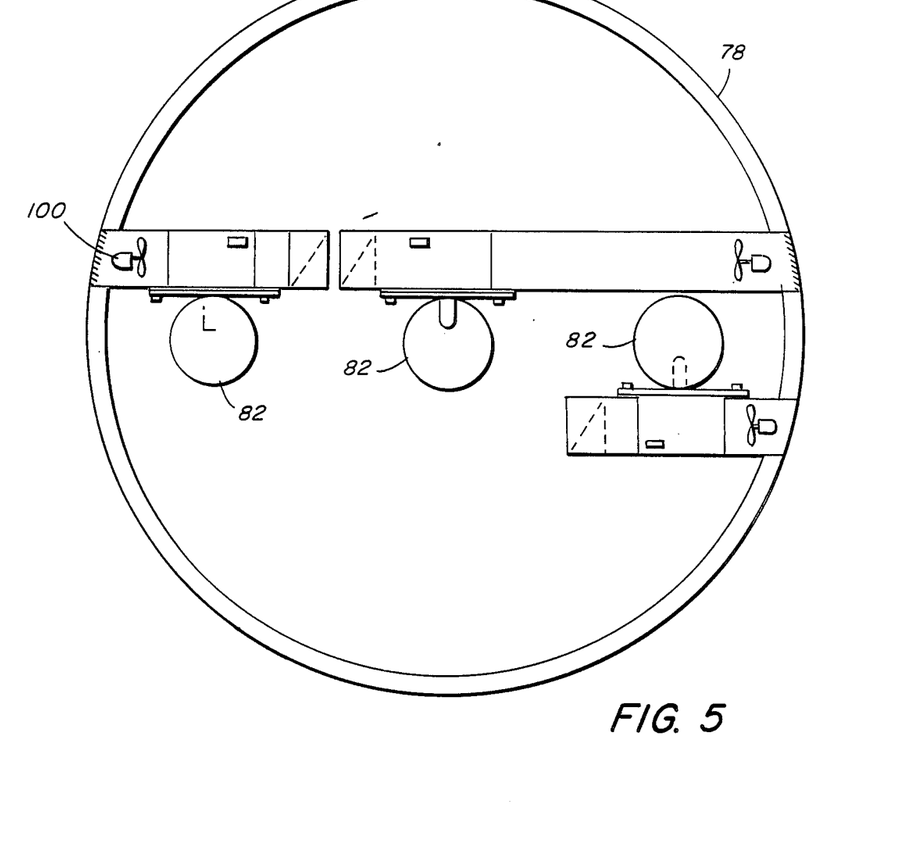
FIG. 5 is a plan view of FIG. 4 taken at the interface of the adaptor fixture.

Referring now to the alternate embodiment of FIG. 4, there is shown an apparatus 70 made in accordance with the present invention for reducing the viscosity of high viscosity material in a container 72, for example a standard fifty-five gallon drum. Apparatus 70 includes an enclosure 74 and a fixture 76 which is configured to be in mating engagement with the top lid of the drum 72. Apparatus 70 is secured to the drum 72 by means of a clamping ring 78 which is of the type which is normally used to secure the standard drum cover to the drum. Cover 76 has sloping sides 80 which elevate the cover's top plane high enough to form an open area below the cover surface. This open area is sufficiently large enough to accomodate the material that is displaced when apparatus 10 is inserted into the drum 72. Apparatus 70 has a plurality of waveguides 82, associated antenna domes 84 and reflectors 86. In the illustrated embodiment, by way of example, five waveguides, domes and reflectors are shown. Radiotight choke collars 88 are secured to the top plane of cover 76 about the waveguides 82 to prevent the escape of RF energy (or vapors) as the waveguides slide downwardly into the material whose viscosity is being reduced by the absorption of the microwave energy emitted from antenna dome 84. An "O" ring 90, composed of TFE for example, encompasses waveguides 82 tightly to prevent the escape of vapors; the "O" rings 90 being captively held in the quarter wave groove of the RF choke collars 88. The upper portion of the waveguides 82 are secured to a perforated or grilled cabinet bottom 92 through which air used for cooling purposes passes. An oscillator 94, for example a magnetron, is secured to the flanged portion 96 of waveguide 82. An antenna probe 98 of oscillator 94 projects into waveguide 82. Cooling air fans 100 are ducted between air intake grills 102 and heat sink fins 104 of magnetron 94. Heated air from heat sinks 104 is discharged through a perforated bottom member 92 to preheat the outer skin of waveguides 82. This additional heat aids in the insertion of apparatus 70 into the material in container 72 and in the transfer of additional heat into the material. The weight of filament and high voltage transformers 108 mounted above waveguide 82 aid in further insertion of the waveguides 82 into the material within container 72 as the applied RF energy reduces the viscosity of the contained material. High voltage capacitors 110 and rectifiers 112 are provided for high voltage transformer 108. In addition, high temperature thermal limit switches 114 are mounted on magnetron assembly 94.

A cabinet cover 115 encloses the high voltage and other components. Handles and/or lifting eyes (not shown) are provided to facilitate moving and storage of apparatus 70. A controller assembly 116, which may be digital or analog, is mounted to enclosure 74 and projects through cabinet cover 115. A temperature probe 118, which interlocks with controller 116 is used to maintain selected temperature conditions. A safety interlock switch 120 is connected to controller 116 to prevent operation of apparatus 70 until a radiotight interface connection is made between cover 76 and drum 72. Other interlock switches may be incorporated to detect closure of locking ring 78.

Figure 6:
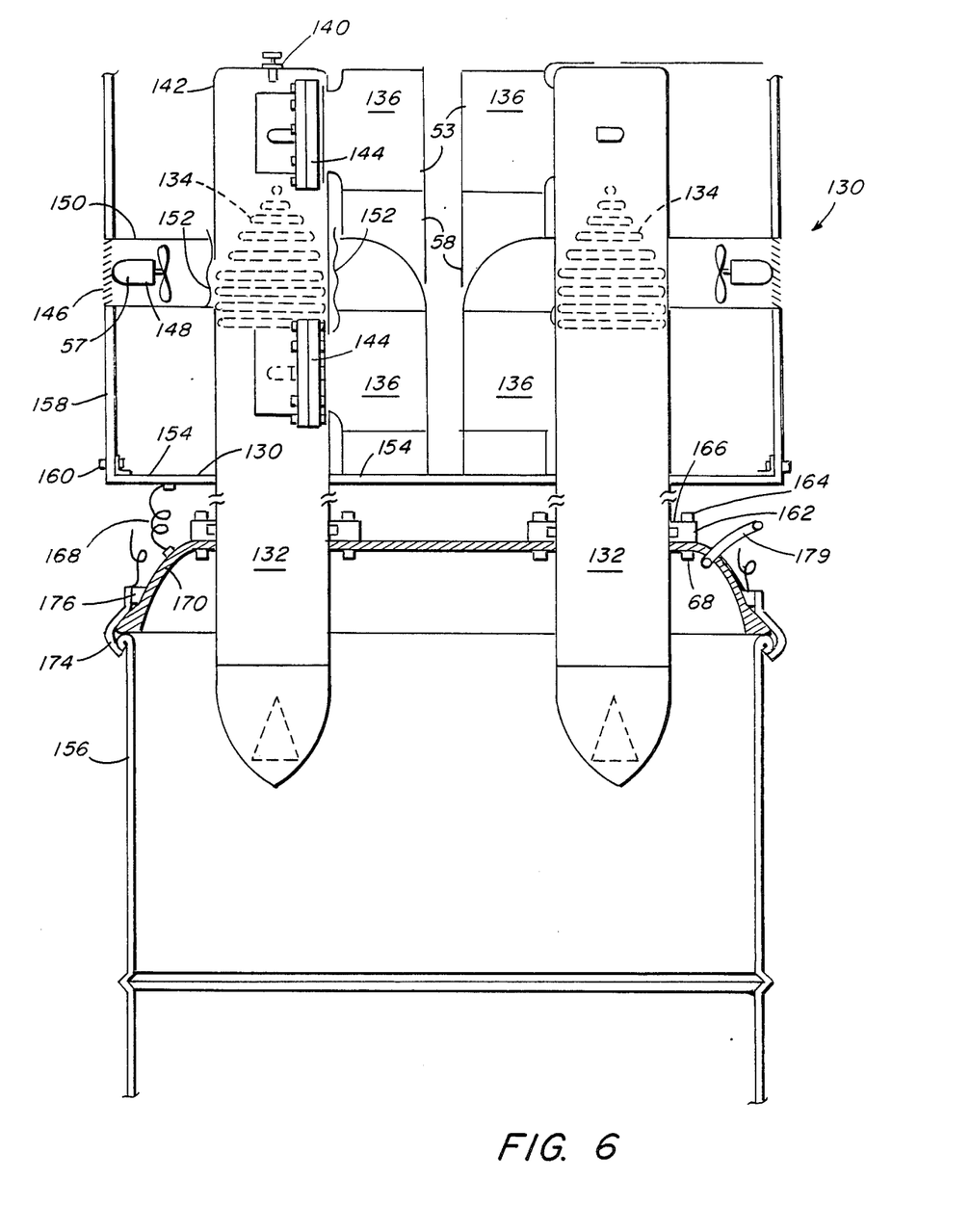
FIG. 6 is another embodiment of the invention of FIG. 1.

Referring now to FIG. 6, there is shown an alternative embodiment in the form of an apparatus 130 for reducing the viscosity of high viscosity material. Apparatus 130 includes a dual polarized waveguide 132 which is a circular waveguide. Internal turning vanes 134 are provided to ensure that proper polarization occurs when two or more RF sources 136, for example magnetrons, are mounted in common waveguide 132. A tuning screw 140 which projects into waveguide 132 provides a means for adjustment of the maximum output toward the load. Launching adaptors 142 are secured to waveguide 132 by means of brazing or welding, for example. Magnetrons 136 are bolted to mating flanges 144 which form part of launching adaptors 142. Cool air is brought through grills 146 by fans 148 which are mounted in ducts 150. Cooling air is directed through ducts 150, past heat sink fins 152 of magnetron 136 and exits through perforated enclosure bottom 154 to preheat waveguide 132 to assist in its insertion into the material in a container 156. An enclosure cover 158 is attached to the bottom of the enclosure 154 by means of screws or bolts 160. The waveguide 132 enters the container 156 through a choke collar 162 which has a quarter wave groove 164 which will short circuit any RF emissions, thus preventing their escape from the container. A vapor sealing "O" ring 166 is held captively in groove 164, but allows waveguide 132 to slide up and down without leakage. A grounding lead 168 is attached to a cover 170 of apparatus 130 and the cabinet bottom 154 to assure proper grounding while waveguides 132 are in motion or if the waveguides acquire a film covering of any materials which they contact notwithstanding the wiping action which takes place when the waveguides are retracted or removed from container 156.

Choke collar 162 is secured to cover 170 by bolting, for example, and the cover is interlocked with container 156 by a locking ring or clamp 174. However, in an alternate embodiment, cover 170 and choke collar 162 are cast, molded or machined as a single, unitary member if desired. In this instance, a locking clamp 174 may be incorporated as part of the cover 170.

Interlock switch 176 is shown as attached to cover 170. When locking clamp 174 is properly engaged, interlock switch 176 is depressed and closes an electrical circuit to indicate that the system is ready to be operated. Typically, interlock switch 176 is designed so that it is depressed by the rim of container 156 when it is in proper engagement with apparatus 130. A vent or clean out connection 179 is shown as passing through cover 170. Other typical components such as rectifiers, capacitors, controllers, thermostats and thermocouplers are not shown since they have been shown in previous embodiments.

Figure 7:
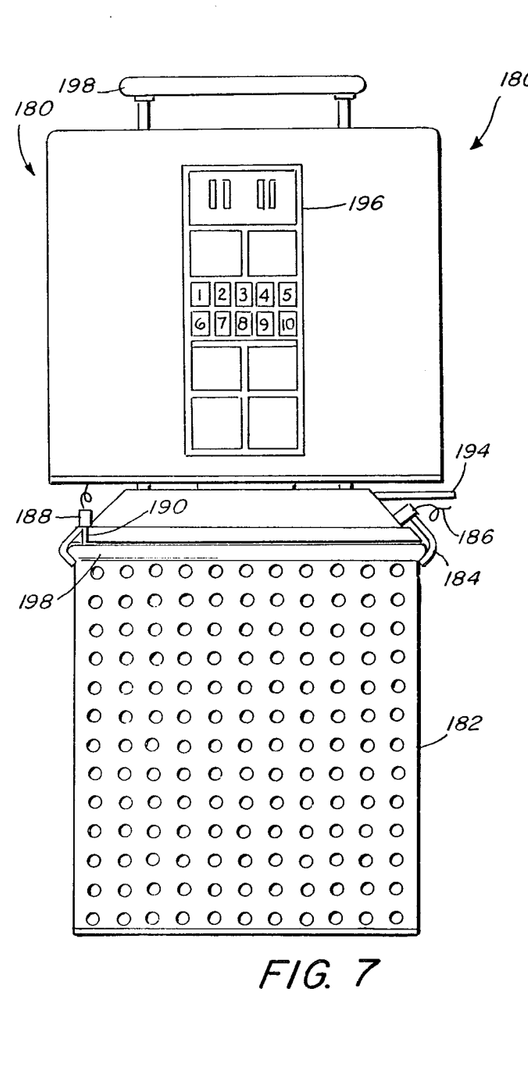
FIG. 7 is yet another embodiment of the invention of FIG. 1.

FIG. 7 illustrates a viscosity reducing apparatus 180 which is attached to a perforated metal container or welded wire basket 182 which provides for removal of vapors or moisture through the openings but said openings are not large enough for the microwaves to escape therethrough. Optimum operation of the unit 180 may be enhanced by blowing hot air through the openings if desired.

Apparatus 180 is held to container 182 by a locking clamp 184. Mating surfaces of the apparatus 180 and the perforated basket 182 are held in locking engagement by the locking clamp 184. Interlock switches 186 and 188 are shown engaged by a ring 190 and basket top 192, respectively. A shorting switch (not shown) is provided to protect the user from tampering by unauthorized persons. A vent connection 194 is provided to prevent vapors from accumulating in the uppermost area of the system exposed thereto.

Apparatus 180 is provided with a digital controller 196. In an alternative embodiment, a manual switching system is used. A handle 198 is provided for carrying apparatus 180.

Innumerable materials, including shellfish; shells; agricultural commodities; minerals; ores; animal droppings; organic wastes; chemicals, and the like which require drying or sterilization may be processed in perforated basket 192 or in containers previously discussed.

Figure 8:
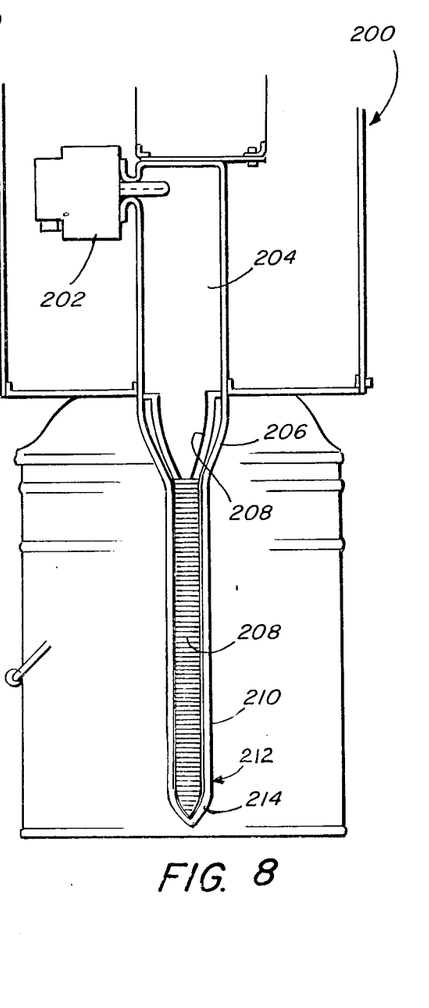
FIG. 8 is a further embodiment of the invention.

FIG. 8 shows an alternate embodiment in the form of a viscosity reducing apparatus 200 having an electromagnetic energy source 202, for example a magnetron. The electromagnetic energy is directed through a circular, metal waveguide 204 in a manner similar to that previously described. However, in order to facilitate insertion of waveguide 200 into semi-solid or solid materials, a smaller diameter tube is desirable. A coaxial system may be employed, but insertion into some types of materials may result in possible arcing between inner and outer conductors if the dielectric spacers break down. The preferred embodiment illustrated in FIG. 8 shows a two thirds reduction in diameter of waveguide 204 by installation of a concentric reducer 206 which contains a dielectric material 208 such as alumina. Dielectric 208 continues down through the smaller tube 210 which is attached to the bottom of reducer 206.

A tubular waveguide 212 is tapered at its bottom and it has a series of vertical slots 214 around the lower perimeter thereof in the same manner as a slotted antenna for transmission of electromagnetic energy therethrough. Slots 214 are sealed liquid and gas tight with an epoxy casting resin or other suitable sealing material. If alumina is selected as the dielectric material 208, it has a dielectric constant that is greater than air by a factor of about 10, resulting in an electromagnetic wave reduction to about one third of its free air space size, thus allowing it to propogate down waveguide 206. Without the dielectric, waveguide 206 is below the cutoff frequency of the electromagnetic wave.

Some heat will be generated on the waveguide's surface due to attenuation of RF in the dielectric medium 208. The heat will be transferred into the contained material via conduction from the waveguide, establishing a convection flow path from bottom to top of the container where the heated liquid may "roll over".

Figure 9:
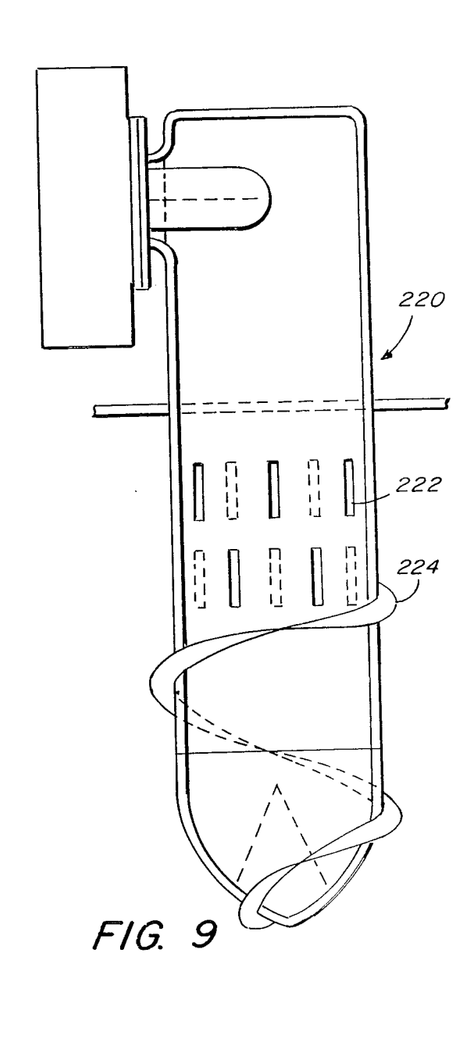
FIG. 9 is a still further embodiment of the invention.

In FIG. 9, a modification of FIG. 3, a waveguide 220 has fine vertical slots 222 which are sealed liquid tight with an epoxy resin for instance. The slots are located circumferentially around the waveguide 220 in the upper and central submersible portions thereof. The greatest concentration of RF energy is emitted from the radiotransparent lower portion of the waveguide, but the slots 222 provide through which side lobes or weaker fields of the microwave energy are broadcast into the contained material, resulting in more rapid liquification. Pulsing the RF energy also increases the efficiency and helps to maintain even energy distribution. Auger vanes 224 may be included as previously described.

Figure 10:
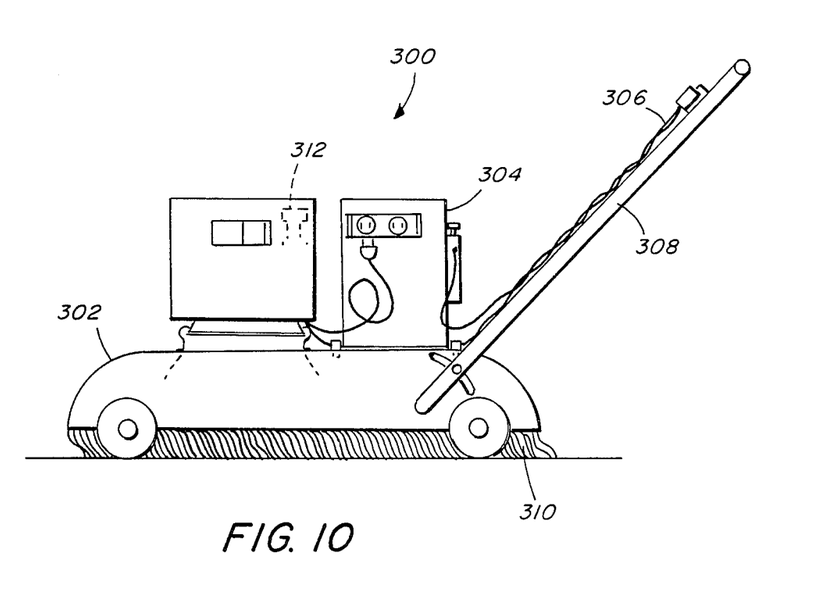
FIG. 10 is still another embodiment of the invention of FIG. 1 in the form of a portable unit.

FIG. 10 illustrates a portable viscosity reducing apparatus 300 which is mounted on a mobile carrier 302. The underside of the carrier 302 is shaped similar to a parabolic reflector for broadcasting into ant colonies, insect nests or the like, for the purpose of destroying them without the use of poisonous chemicals. A plurality of apparatae 300 may be mobilized and pulled from behind a tractor, for instance, along cut rows of sugar cane seed stalks in the field in order to sterilize them on site. Normally the seed stalks are removed to an offsite facility, where they are boiled at 140 degrees F. to destroy disease producing bacteria, then returned to the field and planted. The time, labor and cost savings are obvious, and other agricultural uses abound.

Apparatus 300 may be similar to the one shown in FIG. 1 or it could be constructed in a rectangular configuration, for instance to increase available platform space on the mobile carrier 302 to accommodate an electric generator 304 as an alternate power source if line power is unavailable.

Apparatus 300 and generator 304 are controlled by a remote controller 306 located on a handle 308 or other convenient location. The lower sides of the carrier 302 are shown equipped with an aluminized flexible skirt 310 to prevent the escape of radiation therefrom. Additionally, an internal level sensing switch 312 is provided to detect tipping of the carrier 302 at a predetermined level to effect shut down of high voltage and to prevent accidental escape of RF therefrom.

Figure 11:
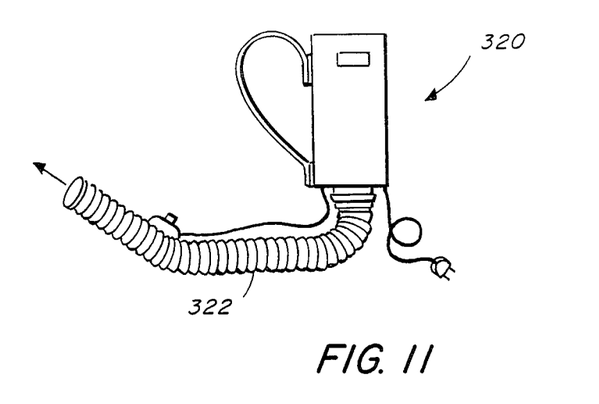
FIG. 11 is an alternate embodiment of FIG. 10.

FIG. 11 shows another portable configuration which in this case is a back pack 320 which is equipped with a flexible waveguide applicator 322 used to beam RF energy into building walls and timbers for instance, to cause the destruction of termites and other vermin without the use of deadly poisons and pesticides, some of which have been outlawed.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An apparatus for reducing the viscosity of high viscosity materials in a container having a cover, said apparatus comprising:
   (a) housing;
   (b) a fixture mounted to said housing, said fixture including a cover having a mating surface which corresponds to the mating surface of the container cover, said fixture cover configured to interconnect and mate with the upper edge of a container containing the high viscosity material in place of the container cover;
   (c) means for clamping said fixture cover to the container, said clamping means forcing said fixture cover into intimate locking contact with the upper edge of the container;
   (d) electromagnetic energy power source means mounted within said housing, said electromagnetic energy power source means having energized and deenergized states, electromagnetic energy generated from said electromagnetic energy power source means when in its energized state;
   (e) interlock means associated with said fixture cover and communicating with said electromagnetic energy power source for preventing said electromagnetic energy power source means from being energized until said cover is in intimate locking engagement with the container; and
   (f) means for directing said electromagnetic energy generated by said electromagnetic energy power source means to the high viscosity material in the container;
   (g) said electromagnetic energy directed toward said high viscosity material being sufficiently high to heat the high viscosity material and reduce its viscosity.

2. The apparatus as claimed in claim 1 wherein said fixture cover has a lower beveled edge which is configured to mate with the upper edge of the container containing the high viscosity material, said clamping means forcing said beveled edge of said fixture cover downwardly into intimate contact with the upper edge of the container.

3. The apparatus as claimed in claim 2 including a quarter wave choke mounted to said fixture cover, said directing means passing through said quarter wave choke.

4. The apparatus as claimed in claim 1 wherein said means for directing includes a waveguide which terminates in an antenna dome.

5. The apparatus as claimed in claim 4 including a dielectric medium in said waveguide to facilitate insertion into viscous materials and to establish a liquid convection zone waveguide into said contained material.

6. The apparatus as claimed in claim 5 including a directional reflector mounted within said antenna dome for redirecting said electromagnetic energy into the high viscosity material.

7. The apparatus as claimed in claim 5 including auger vanes disposed about said antenna dome for facilitating insertion into the high viscosity material.

8. The apparatus as claimed in claim 1 wherein said means for directing includes at least first and second waveguides and first and second antenna domes, said first waveguide associated with said first antenna dome and said second waveguide associated with said second antenna dome.

9. The apparatus as claimed in claim 8 wherein said electromagnetic energy power source means includes a first microwave energy source for said first waveguide and a second microwave energy source for said second waveguide.

10. The apparatus as claimed in claim 8 wherein said electromagnetic energy source means includes first and second microwave energy sources associated with said first waveguide and first antenna dome, and second and third microwave energy sources associated with said second waveguide and second antenna dome.

11. An apparatus for reducing the viscosity of a high viscosity material in a container having a cover said apparatus comprising:
   (a) a housing;
   (b) a fixture attached to said housing, said fixture having a cover which is configured to replace the container cover and interlock with the upper edge of the container in place of the container cover, said fixture cover having a beveled lower edge;
   (c) means for clamping said fixture cover to the container, said clamping means forcing said beveled edge of said fixture cover into intimate contact with a top edge of the container;
   (d) a source for generating electromagnetic energy, said source mounted in said housing; and
   (e) means for reflecting said electromagnetic energy generated by said source toward the high viscosity material in said container when said fixture cover and container are interlocked;
   (f) said electromagnetic energy directed toward said material heats said material and reduces its viscosity.

12. A method of reducing the viscosity of a high viscosity material in a container having a cover, said method comprising the steps of:
   (a) placing an electromagnetic energy generating apparatus on a container of high viscosity material in place of the container cover, said electromagnetic energy generating apparatus having a fixture with a cover that is configured to mate with the top edge of the container in place of the container cover, said fixture cover having a lower beveled edge;
   (b) clamping said fixture cover to the container by forcing said lower beveled edge of said fixture cover into intimate contact with the top edge of the container;
   (c) directing electromagnetic energy generated by said apparatus to the material in the container; and
   (d) heating the high viscosity material by said electromagnetic energy and reducing the viscosity of said high viscosity material.

* * * * *